April 17, 1956  H. T. WHITE  2,741,990
MOTOR DRIVEN PUMPS
Filed Nov. 26, 1952  2 Sheets-Sheet 1
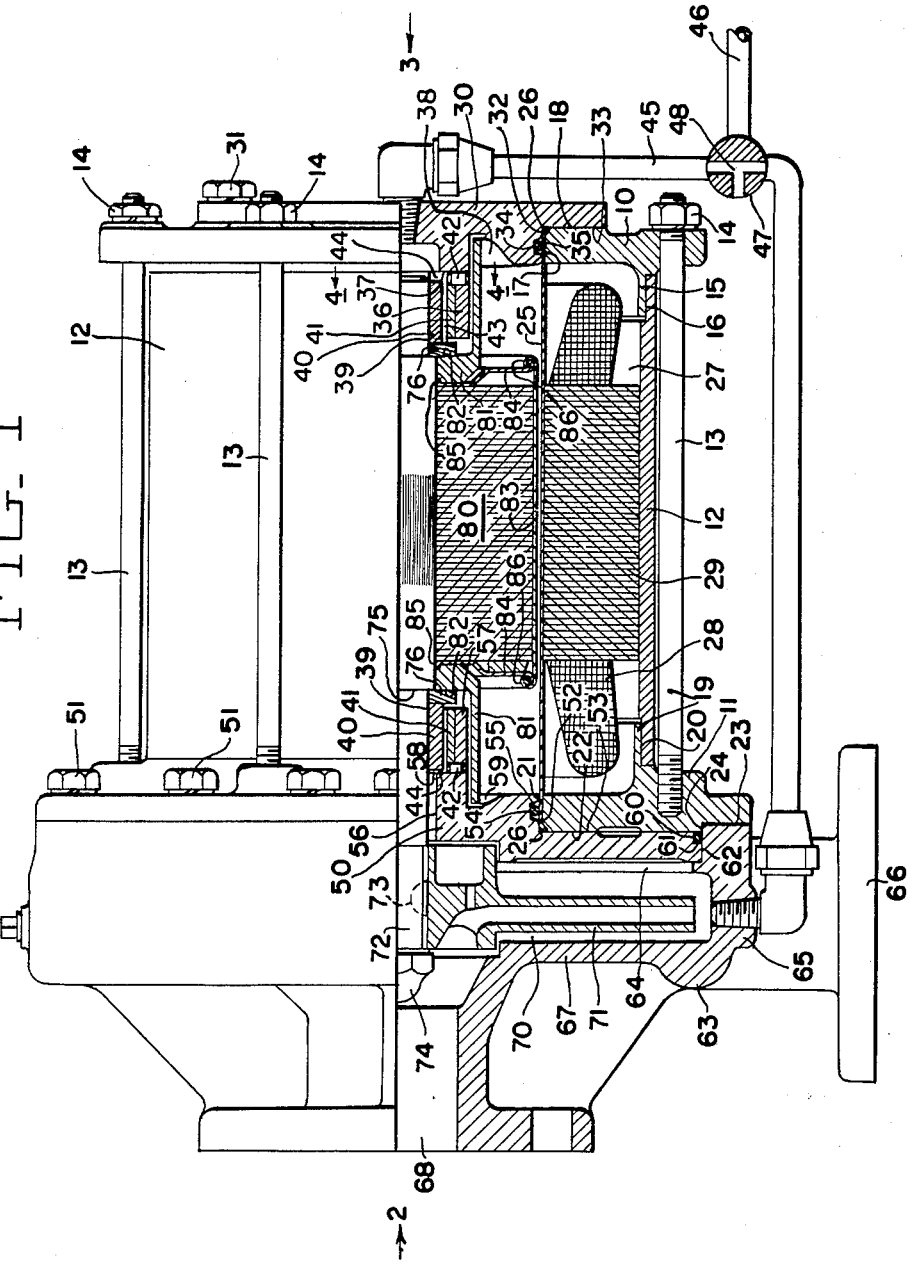
INVENTOR.
HOWARD T. WHITE
BY
ATTORNEY April 17, 1956 H. T. WHITE 2,741,990
MOTOR DRIVEN PUMPS
Filed Nov. 26, 1952 2 Sheets-Sheet 2
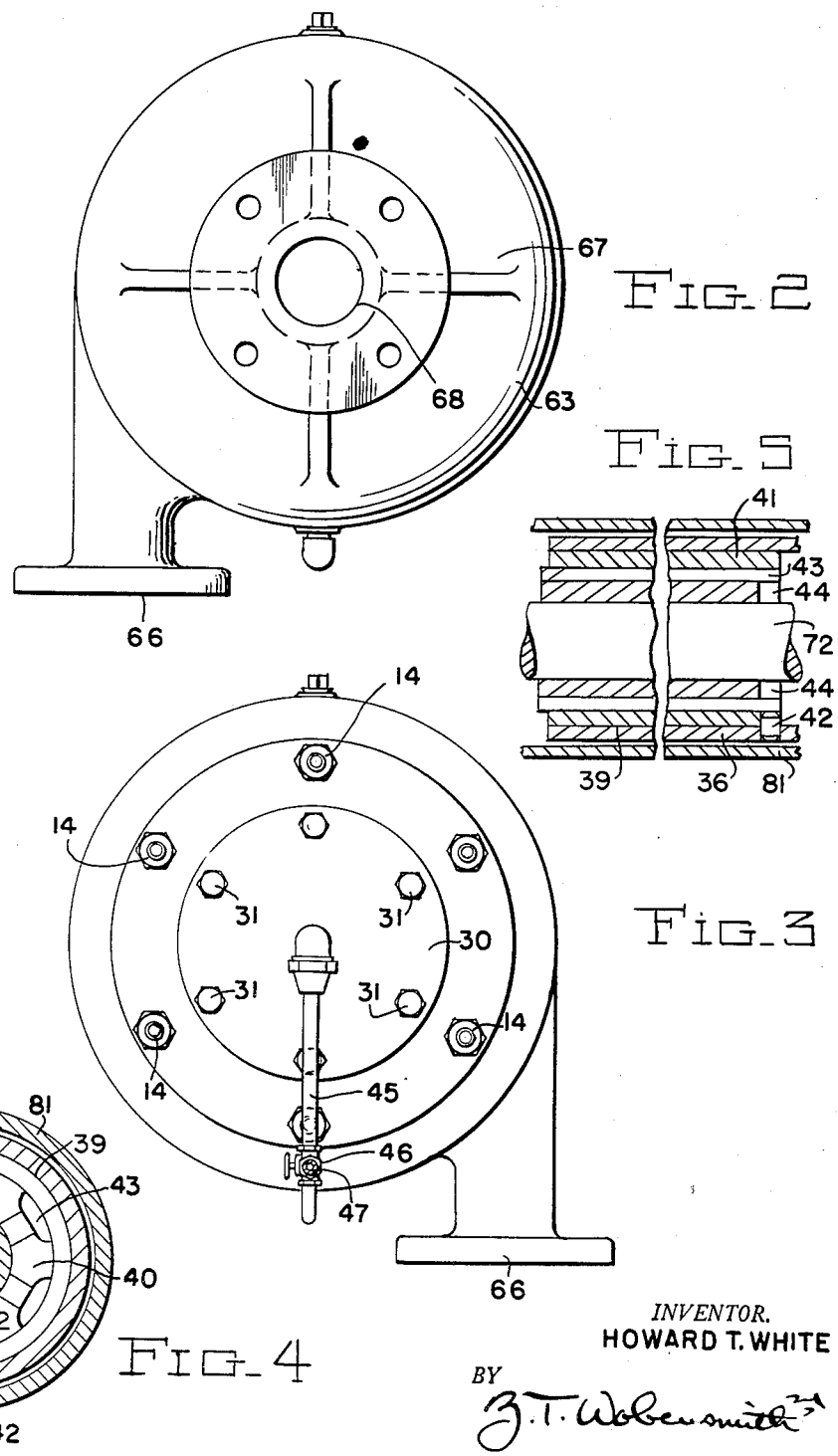
INVENTOR.
HOWARD T. WHITE
BY
ATTORNEY

United States Patent Office 2,741,990
Patented Apr. 17, 1956

2,741,990
MOTOR DRIVEN PUMPS

Howard T. White, Melrose Park, Pa.

Application November 26, 1952, Serial No. 322,597

8 Claims. (Cl. 103—87)

This invention relates to motor driven pumps.

It is the principal object of the present invention to provide a motor driven pump having an isolated stator and with improved arrangements for obviating any likelihood of explosion if the fluid pumped or its vapors are of an explosive character.

It is a further object of the present invention to provide a motor driven pump which as particularly adapted for the pumping of corrosive or erosive fluids.

It is a further object of the present invention to provide a motor driven pump particularly adapted for the pumping of corrosive or erosive fluids in which improved bearing lubrication is effected.

It is a further object of the present invention to provide an improved motor rotor construction for use in motor driven pumps.

Other objects and advantageous features of the invention will be apparent from the specification and claims.

The nature and characteristic features of the invention will be more readily understood from the following description, taken in connection with the accompanying drawings forming part hereof, in which:

Figure 1 is a view partly in elevation and partly in longitudinal vertical section of a motor driven pump in accordance with the present invention;

Fig. 2 is an end elevational view of the motor driven pump shown in Fig. 1 as seen from the left of Fig. 4;

Fig. 3 is an end elevational view as seen from the right of Fig. 1;

Fig. 4 is a transverse sectional view, enlarged, taken approximately on the line 4—4 of Fig. 1; and Fig. 5 is a longitudinal sectional view taken approximately on the line 5—5 of Fig. 4.

It should, of course, be understood that the description and drawings herein are illustrative merely, and that various modifications and changes may be made in the structure disclosed without departing from the spirit of the invention.

Like numerals refer to like parts throughout the several views.

Referring now more particularly to the drawings, the motor driven pump in accordance with the present invention therein illustrated preferably includes a pair of annular end frame plates 10 and 11, of any desired material, cast iron being suitable. An outer cylindrical housing 12 is interposed between the end plates 10 and 11. The plates 10 and 11 and the housing 12 are preferably held in assembled relation by studs 13 engaging in the plate 11 and extending through the plate 10 with nuts 14 on their outer ends.

The end plate 10 has an axially extending interior rim 15 with an outer axial machined face for engagement with a complemental interior axial face 16, also machined, on the interior of the housing 12.

The end plate 10 has a central bore or opening 17 therein for purposes to be explained, and surrounding the opening 17 on the exterior side thereof, a finished radial face 18 is provided.

The end plate 11 also has an axially extending interior rim 19, with an outer axial machined face for engagement with a complemental interior axial face 20, also machined, on the interior of the housing 12.

The end plate 11 has a central bore or opening 21 therethrough and surrounding the opening 21 on the exterior side thereof a finished or machined radial face 22 is provided. The plate 11, at its periphery, has a radial face 23 and an annular shoulder 24.

Extending between the end plates 10 and 11 and in tight engagement in the bores 16 and 21, a cylindrical sleeve 25 is provided, of non-magnetic responsive material and preferably of stainless steel. The sleeve 25 has its ends 26 flared outwardly in complemental recesses in the bores 17 and 21 to prevent displacement and aid in maintaining a fluid tight relation at these locations. While the dimensions of the sleeve 25 and of the other components may be varied as desired for a 1, 2 or 3 horsepower unit the sleeve 25 may have an internal diameter of the order of 4 inches and a length of the order of 9 inches.

An isolated and sealed motor stator chamber 27 is thus provided between the end plates 10 and 11 and in the space between the sleeve 25 and the housing 12. Within the chamber 27, field windings 28 and laminated field pieces 29 are provided, the windings 28 being energized from any suitable source of alternating current delivered by suitable conductors (not shown).

In order to close the opening at the end of the sleeve 25 at the plate 10, an end closure plate 30 is provided, secured in position on the end plate 10 by bolts 31. The plate 30 has an annular face 32 from which a diametral face 33 extends outwardly. The face 32 has an annular groove 34 therein for the reception of a packing ring 35, preferably of the type known as an O-ring, in engagement with the sleeve 25, to prevent fluid leakage at this location. The face 33 is in engagement with the face 18 for purposes to be explained.

The plate 30, at the central portion thereof has an inwardly extending annular flange 36 with a radial positioning shoulder 37 thereon and a recess 38 therearound. A bearing 39 is provided having an inner ring 40 of graphite, or teflon, or the like, with an outer metallic supporting and holding sleeve 41, shorter axially than the ring 40, and of a material resistant to the fluid being pumped, stainless steel being suitable for some purposes.

The bearing 39 is adapted to be held in position on the flange 36 by a pin 42 which extends through the flange 36 and has its outer end welded in place.

The ring 40 is provided, on the outer portion thereof and within the sleeve 41 with a plurality of axial grooves 43 and radial end slots 44 for lubricating fluid circulation.

The plate 30 also may, if desired, have connected thereto a pipe 45 having a supply pipe 46 connected thereto with a valve 47 having T-shaped ports 48 therein for control purposes, as hereinafter explained.

At the opposite or inner end of the sleeve 25, at the plate 11, a closure wall plate 50 is provided secured in position by bolts 51.

The wall plate 50 has an inner annular face 52 from which a diametral face 53 extends. The face 52 has an annular groove 54 therein for the reception of a packing ring 55, preferably of the type known as an O-ring, in engagement with the sleeve 25, to prevent fluid leakage at this location. The face 53 is in engagement with the face 22 for purposes to be explained.

The wall plate 50, at the central portion thereof has an axial bore or opening 56 and extending from therearound has an inwardly extending annular flange 57 with a radial positioning shoulder 58 and a recess 59 therearound. A bearing 39, of the character previously described is mounted on the flange 57 and held in position by a pin 42 welded in position in the flange 57.

The wall plate 50, at the periphery thereof, may be provided with an annular groove 60 for the reception of a packing ring 61, preferably of the type known as an O-ring, for engagement with the plate 11 and with an interior annular face 62 of a pump housing 63.

The pump housing 63 has an annular flange or rim 64, extending inwardly from the face 62 with which the wall plate 50 engages.

The pump housing 63 has an outer cylindrical wall 65 with a fluid delivery connection 66 formed on the periphery and a transverse wall 67 with a central axial fluid inlet 68 provided thereon. The wall plate 50 is held in engagement with the rim 64 by the plate 11, the studs 51 extending through the plate 11 and into the housing 63 for this purpose.

An impeller chamber 70 is thus provided within the housing 63, between the wall plate 50 and the transverse wall 67, for the reception of an impeller 71 of any desired type, mounted on an axial shaft 72 and keyed to the shaft 72 by a key 73. The end of the shaft 72 may have a nut 74 thereon, removable for removal of the impeller 71. The nut 74 is preferably of the closed end type with its outer face curved to aid in directing the entering fluid.

The shaft 72 is supported in the bearings 39, has oppositely facing shoulders 75 for engagement with thrust rings 76 interposed between the shoulders 75 and the inner end faces of the bearing rings 40.

Between the shoulders 75, the motor rotor 80 is mounted and may be of any preferred type, a laminated short circuited type being suitable.

The rotor 80 for the purposes of the present invention preferably has extending outwardly from each end thereof flanges 81, extending respectively into the recesses 38 and 59 in the end plates 10 and 11 and in closely spaced relation to the outer faces of the flanges 36 and 57. The radial walls 82 of the flanges 81 may also be alined with the shoulders 75 and bear against the thrust rings 76.

If the motor rotor 80 is to be employed for the pumping of corrosive liquids or of erosive liquids the rotor laminations may be enclosed within a cylindrical outer cover 83, of corrosive or erosive resistant sheet material, stainless steel being suitable for some purposes. End cover plates 84 may also be provided, of resistant sheet material of the same type as the cover 83. The plates 84 at their inner ends may have flared inner edges 85 in fluid tight engagement with the shaft 72, may be held in engagement with the laminations of the motor rotor 80 by the flanges 81 and at their junctions with the cover 83 are connected by fluid tight joints 86 of the rolled or other preferred type.

The pump housing 63, if desired, and for the purposes of supplying a very small quantity of the pumped liquid for lubricating the bearings 39 may have the pipe 45 connected thereto.

The mode of operation will now be pointed out.

Upon energization of the windings 28, a rotating field is set up in the laminations 29 which is effective for rotating the motor rotor 80, the shaft 72 on which it is mounted, and the impeller 71 carried by the shaft 72.

Fluid entering through the fluid inlet 68 and into the impeller chamber 70 is delivered by the impeller 71 to the fluid outlet 66.

A small quantity of the pumped fluid may be delivered through the pipe 45 to the space within the closure plate 30 from which it passes to the contiguous outer bearing 39. The grooves 44 and passageways 43 permit free access of the fluid around the ring 40 for lubrication and cooling of the bearing 39. This fluid may then pass in the space between the flange 36 and the flange 81 to the space 38 and then along the exterior of the rotor 80 to the space 59 between the flanges 57 and 81 and through the passageways 43 and 44 for lubricating and cooling the inner bearing 39. The fluid then passes through the bore 56 and to the impeller for delivery with the main body of the pumped liquid.

If the liquid being pumped is erosive, by reason of abrasive material carried therein, the valve 47 may have its parts 48 positioned to cut off the supply of fluid from the impeller housing 63 and to permit the supplying of carrier fluid from the pipe 46 of the same character as that being pumped but free from the abrasive material content.

Reference has previously been made to the contact of certain machined faces, these being particularly effective for preventing explosions if the liquid being pumped, or its vapors, are of an explosive character.

The closely contacting surfaces between the face 16 and the flange 15 at one end and between the face 20 and the flange 19 at the other end of a free and uninterrupted axial distance of the order of ¾ inch for the size of unit previously referred to provide such an exceedingly restricted area and such a length that any vapor therein would be incapable of igniting so that an effective flame trap is provided at these locations. The small size of orifice at these locations causes an adibatic expansion of any gas passing therethrough. At the same time the metallic bounding walls have a tendency to cool such gas. Any flame which might be present cannot pass through the barriers thus provided.

In a similar manner the restricted orifice areas and length of the orifices between the flange 36 and the flange 81, and between the flange 57 and the flange 81, with running radial clearances of ten one-thousandths of an inch and a length of the order of one and one half inches provides flame traps at the bearings.

In similar fashion, with length of the order of ¾ inches between the faces 18 and 33, between the faces 22 and 53, and between the end covers 84 and the laminations of the rotor 80 outwardly of the shaft 72, flame traps are provided at these locations effectively isolating the motor rotor 80 and the motor stator chamber 27 so that there is no likelihood of explosions or of flame propagation past these barriers.

I claim:

1. In a motor driven pump, spaced end housing members, a pump chamber housing exteriorly mounted on one of said end housing members and having fluid inlet and delivery connections, a pump rotor in said pump chamber housing, an outer housing member extending between said end housing members, a cylindrical sleeve member extending between said end housing members within said outer members, the space between said members providing a motor stator chamber isolated from said pump chamber housing and the space within said sleeve member providing a motor rotor chamber, a motor rotor in said motor rotor chamber, a shaft connecting said pump and motor rotors, closure members for the ends of said sleeve member mounted on said end housing members, sealing members between said closure members and said end housing members, and interengaging faces on said closure members and said end housing members between the interior of said closure and end housing members and the exterior, said faces having between their marginal extremities contacting surfaces with a continuous free and uninterrupted radial distance of at least three quarters of an inch providing a flame trap.

2. In a motor driven pump, spaced end housing members, a pump chamber housing exteriorly mounted on one of said end housing members and having fluid inlet and delivery connections, a pump rotor in said pump chamber housing, an outer housing member extending between said end housing members, a cylindrical sleeve member extending between said end housing members within said outer members, the space between said members providing a motor stator chamber isolated from said pump chamber housing, and the space within said sleeve member providing a motor rotor chamber, a motor rotor in said motor rotor chamber, a shaft connecting said pump and motor rotors, closure members for the ends of said sleeve member mounted on said end housing members and extending into said sleeve member, and interengaging faces on said closure members and said end housing members outwardly of said sleeve member between the interior of said closure and end housing members and the exterior, said faces having between their marginal extremities contacting surfaces with a continuous free and uninterrupted radial distance of at least three quarters of an inch providing a flame trap.

3. In a motor driven pump, spaced end housing members, an outer housing member extending between said end housing members, a cylindrical sleeve member extending between said end housing members within said outer member, the space between said members providing a motor stator chamber and the space within said sleeve member providing a motor rotor chamber, a motor rotor in said motor rotor chamber, closure members for the ends of said sleeve member mounted on said end housing members, each of said closure members having an axially extending sleeve, bearings on said sleeves, a shaft journalled in said bearings and a motor rotor secured to said shaft and having axially extending flanges coaxial with and in closely spaced relation to said sleeves to provide a flame trap therebetween.

4. In a motor driven pump, spaced end housing members, an outer housing member extending between said end housing members, a cylindrical sleeve member extending between said end housing members within said outer member, the space between said members providing a motor stator chamber and the space within said sleeve member providing a motor rotor chamber, a motor rotor in said motor rotor chamber, closure members for the ends of said sleeve member mounted on said end housing members, each of said closure members having an axially inwardly extending sleeve, bearings removably mounted on said sleeves, a shaft journalled in said bearings, and a motor rotor secured to said shaft and having axially outwardly extending flanges coaxial with and in closely spaced relation to said sleeves to provide a flame trap therebetween.

5. In a motor driven pump, a pump housing having fluid inlet and outlet connections and an interior impeller chamber, an interiorly extending annular abutment flange at a boundary of said chamber, a first closure member for said pump housing engaging said flange, a second closure member spaced from said first closure member, spaced frame members secured to each of said closure members, an outer cylindrical housing having end portions in engagement with said frame members, an inner cylindrical sleeve member in engagement at its ends with said closure members and said frame members, the space between said frame members, said housing and said sleeve member providing a motor stator chamber, bearings in said cylindrical sleeve member, a shaft journalled in said bearings, an impeller in said impeller chamber carried by said shaft, and a motor rotor carried by said shaft within said cylindrical sleeve member.

6. In a motor driven pump, a pump housing having fluid inlet and outlet connections and an interior impeller chamber, an interiorly extending annular abutment flange at a boundary of said chamber, a first closure member for said pump housing engaging said flange, said closure member having an axially inwardly extending bearing supporting sleeve, a second closure member spaced from said first closure member and having an axially inwardly extending bearing supporting sleeve, spaced frame members secured to each of said closure members, an outer cylindrical housing having end portions in engagement with said frame members, an inner cylindrical sleeve member in engagement at its ends with said closure members and said frame members, the space between said frame members, said housing and said sleeve member providing a motor stator chamber, bearings carried by said bearing supporting sleeves, a shaft journalled in said bearings, an impeller in said impeller chamber carried by said shaft, and a motor rotor carried by said shaft between said bearings.

7. In a motor driven pump, a pump housing having fluid inlet and outlet connections and an interior impeller chamber, an interiorly extending annular abutment flange at a boundary of said chamber, a first closure member for said pump housing engaging said flange, said closure member having an axially inwardly extending bearing supporting sleeve, a second closure member axially spaced from said first closure member and having an axially inwardly extending bearing supporting sleeve, axially spaced frame members secured to each of said closure members, an outer cylindrical housing having end portions in telescoped relation to portions of said frame members, an inner cylindrical sleeve member in engagement at its ends with said closure members and said frame members, the space between said frame members, said housing and said sleeve member providing a motor stator chamber, bearings carried by said bearing supporting sleeves, a shaft journalled in said bearings, an impeller in said impeller chamber carried by said shaft, and a motor rotor carried by said shaft between said bearings.

8. In a motor driven pump, a pump housing having fluid inlet and outlet connections and an interior impeller chamber, an interiorly extending annular abutment flange at a boundary of said chamber, a first closure member for said pump housing engaging said flange, a sealing member interposed between said first closure member and said pump housing, said closure member having an axially inwardly extending bearing supporting sleeve, a second closure member axially spaced from said first closure member and having an axially inwardly extending bearing supporting sleeve, spaced frame members secured to each of said closure members, an outer housing having end portions in telescoped relation to portions of said frame members, an inner cylindrical sleeve member in engagement at its ends with said closure members and said frame members, sealing members interposed between said closure member and said sleeve member, the space between said frame members, said housing and said sleeve member providing a motor stator chamber, bearings removably carried by said bearing supporting sleeves, a shaft journalled in said bearings, an impeller in said impeller chamber carried by said shaft, and a motor rotor carried by said shaft between said bearings.

References Cited in the file of this patent

UNITED STATES PATENTS

| | | |
|---|---|---|
| 1,114,727 | Breeze | Oct. 27, 1914 |
| 1,377,326 | Durnford | May 10, 1921 |
| 1,720,364 | Holmes | July 9, 1929 |
| 1,973,070 | Hess et al. | Sept. 11, 1934 |
| 2,277,333 | Leopold | Mar. 24, 1942 |
| 2,301,063 | McConaghy | Nov. 3, 1942 |
| 2,325,930 | Avigdor | Aug. 3, 1943 |
| 2,400,192 | Coons | May 14, 1946 |
| 2,463,936 | Allison | Mar. 8, 1949 |
| 2,485,408 | Pezzillo | Oct. 18, 1949 |
| 2,517,233 | Peters | Aug. 1, 1950 |
| 2,568,548 | Howard et al. | Sept. 18, 1951 |
| 2,669,187 | Guyer | Feb. 16, 1954 |
| 2,687,695 | Bloom et al. | Aug. 31, 1954 |

FOREIGN PATENTS

| | | |
|---|---|---|
| 157,495 | Austria | Nov. 25, 1939 |